US008957808B2

(12) United States Patent
Ookawa (10) Patent No.: US 8,957,808 B2
(45) Date of Patent: Feb. 17, 2015

(54) PHASED ARRAY ANTENNA AND ITS PHASE CALIBRATION METHOD (75) Inventor: Kunihiko Ookawa, Kariya (JP)

(73) Assignee: Denso Corporation, Kariya (JP)

( * ) Notice: Subject to any disclaimer, the term of this patent is extended or adjusted under 35 U.S.C. 154(b) by 603 days.

(21) Appl. No.: 13/314,354

(22) Filed: Dec. 8, 2011

(65) Prior Publication Data
US 2012/0146840 A1 Jun. 14, 2012

(30) Foreign Application Priority Data
Dec. 9, 2010 (JP) ................................ 2010-274511

(51) Int. Cl.
G01S 7/40 (2006.01)
H01Q 3/26 (2006.01)
H01Q 3/36 (2006.01)

(52) U.S. Cl.
CPC ................ G01S 7/4004 (2013.01); G01S 7/40 (2013.01); H01Q 3/267 (2013.01); H01Q 3/36 (2013.01)
USPC ............................ 342/174; 342/165; 342/173

(58) Field of Classification Search
CPC .......................................... G01S 7/40–7/4056
USPC ................................................ 342/165–175
See application file for complete search history.

(56) References Cited

U.S. PATENT DOCUMENTS

| 4,926,186 A * | 5/1990 | Kelly et al. ..................... 342/360 |
| 4,994,813 A * | 2/1991 | Shiramatsu et al. ........... 342/360 |
| 5,187,486 A * | 2/1993 | Kolzer ............................ 342/360 |
| 5,294,934 A * | 3/1994 | Matsumoto .................... 342/173 |
| 5,477,229 A * | 12/1995 | Caille et al. .................... 342/360 |
| 5,530,449 A * | 6/1996 | Wachs et al. ................... 342/174 |
| 5,559,519 A * | 9/1996 | Fenner ........................... 342/174 |
| 5,677,696 A * | 10/1997 | Silverstein et al. ............ 342/360 |

(Continued)

FOREIGN PATENT DOCUMENTS

| CN | 101483273 | 7/2009 |
| CN | 101483274 | 7/2009 |

(Continued)

OTHER PUBLICATIONS

Office Action dated Jun. 13, 2014 in corresponding Chinese Application No. 201110410007.7.

(Continued)

Primary Examiner — Peter Bythrow
(74) Attorney, Agent, or Firm — Harness, Dickey & Pierce, PLC (57) ABSTRACT A phase array antenna includes an oscillator, a plurality of antenna elements, a phase shifter, a distributor, a receiving unit, and a control processor. The control processor performs a calibration process to select, from the antenna elements, a reference and target antenna elements to allow the radio waves generated by the oscillator to be provided for the reference and target antenna elements via the distributor, obtain a pattern of a change in a received power of radio waves received at the receiving unit, when a phase of the phase shifter for the reference antenna element is fixed and a phase of the phase shifter for the target antenna element is changed, extract, from the pattern obtained, the phase of the phase shifter for the target antenna element at which the received power becomes a local minimal value, and add the phase extracted to 180° to set its resultant value to a calibration value for the phase of the phase shifter for the target antenna element.

10 Claims, 5 Drawing Sheets (56) References Cited

U.S. PATENT DOCUMENTS

| | | | |
|---|---|---|---|
| 5,809,063 A * | 9/1998 | Ashe et al. | 375/141 |
| 5,861,843 A * | 1/1999 | Sorace et al. | 342/372 |
| 5,867,123 A * | 2/1999 | Geyh et al. | 342/372 |
| 5,929,809 A * | 7/1999 | Erlick et al. | 342/372 |
| 6,127,966 A * | 10/2000 | Erhage | 342/174 |
| 6,208,287 B1 * | 3/2001 | Sikina et al. | 342/174 |
| 6,339,399 B1 * | 1/2002 | Andersson et al. | 342/372 |
| 6,507,315 B2 * | 1/2003 | Purdy et al. | 342/374 |
| 6,771,216 B2 * | 8/2004 | Patel et al. | 342/368 |
| 7,545,321 B2 * | 6/2009 | Kawasaki | 342/368 |
| 2003/0038747 A1 * | 2/2003 | Patel et al. | 342/368 |
| 2003/0142012 A1 * | 7/2003 | Hirabe | 342/173 |
| 2007/0069945 A1 * | 3/2007 | Weese | 342/174 |
| 2009/0027258 A1 * | 1/2009 | Stayton | 342/174 |
| 2009/0109085 A1 * | 4/2009 | Needham et al. | 342/174 |
| 2010/0117890 A1 * | 5/2010 | Vook et al. | 342/174 |

FOREIGN PATENT DOCUMENTS

| | | |
|---|---|---|
| JP | 02-183172 | 7/1990 |
| JP | 2006-304205 | 11/2006 |
| WO | WO 2004/013644 | 2/2004 |

OTHER PUBLICATIONS

Office Action issued Nov. 5, 2013 in corresponding CN Application No. 201110410007.7 (with English translation).

* cited by examiner

CHANGE IN RECEIVED POWER WHEN
PHASE OF TARGET ANTENNA IS CHANGED

FIG.5

PHASED ARRAY ANTENNA AND ITS PHASE CALIBRATION METHOD

CROSS-REFERENCE TO RELATED APPLICATION

This application is based on and claims the benefit of priority from earlier Japanese Patent Application No. 2010-274511 filed Dec. 9, 2010, the description of which is incorporated herein by reference.

BACKGROUND OF THE INVENTION

1. Technical Field of the Invention

The present invention relates to a phased array antenna including a plurality of antenna elements and its phase calibration method for calibrating a phase of each antenna element.

2. Related Art

A phased array antenna including a plurality of antenna elements is needed to calibrate a phase of each antenna element in such a manner that radio waves outputted by the antenna elements have the same phase under a predetermined set of conditions.

In the related art, a technique is known to, upon a calibration of a phase of the plurality of antenna elements, (i) change a phase of only one arbitrary antenna element under condition that radio waves with a predetermined power is radiated, (ii) monitor a resultant change in a radiated power of all of the plurality of antenna elements at a receiver located at a front plane side of a radio wave radiation plane to obtain a phase value of the one arbitrary antenna element, (iii) perform the above steps (i) and (ii) for all antenna elements to obtain phase values of all antenna elements, and (iv) calibrate a phase of each antenna elements based on these phase values (see WO2004/013644 A1).

However, in the case where only one antenna elements is changed, a radiated power capable of being received at the receiver is low. This makes it difficult to precisely obtain a correlation between the resultant change in this one antenna element and the radiated power. Accordingly, in the case where a change in the radiated power of all antenna elements is measured, the phase of the one antenna element cannot be precisely obtained, and then a calibration of antenna elements cannot be accurately performed.

SUMMARY OF THE INVENTION

The present invention has been made in light of the conditions set forth above and has as its exemplary object to provide a phase array antenna and its phase calibration method capable of easily and accurately calibrating a phase of antenna elements of a phased array antenna.

According to an first exemplary aspect of the present invention, there is provided a phased array antenna, comprising: an oscillator that generates radio waves; a plurality of antenna elements that radiates radio waves: a phase shifter that is connected to each of the plurality of antenna elements and changes a phase of radio waves radiated by the plurality of antenna elements: a distributor that distributes radio waves generated by the oscillator to the plurality of antenna elements via the phase shifter; a receiver that receives radio waves radiated by the plurality of antenna elements; and a control processor that performs a calibration process to a) select, from the plurality of antenna elements, a reference antenna element to be a reference of a phase calibration for the phased array antenna and a target antenna element to be a target of the phase calibration with respect to the reference antenna element to allow the radio waves generated by the oscillator to be provided for the reference antenna element and the target antenna element via the distributer, b) obtain a pattern of a change in a received power of radio waves received at the receiver, when a phase of the phase shifter connected to the reference antenna element is fixed and a phase of the phase shifter connected to the target antenna element is changed, c) extract, from the pattern obtained, the phase of the phase shifter connected to the target antenna element at which the received power becomes a local minimal value, and d) add the phase extracted to 180° to set its resultant value to a calibration value for the phase of the phase shifter connected to the target antenna element.

The control processor may repeat the calibration process while changing the target antenna element until the calibration values for all of the plurality of antenna elements are obtained.

The reference antenna element may be one antenna element that is arbitrarily selected from the plurality of antenna elements and is kept selected until the calibration values for all of the plurality of antenna elements are obtained, and the target antenna element may be one antenna element that is selected from the plurality of antenna elements except for the reference antenna element and is repeatedly changed to another antenna element until the calibration values for all of the plurality of antenna elements are obtained.

According to the above phased array antenna, when a phase of the phase shifter connected to the reference antenna element is fixed and a phase of the phase shifter connected to the target antenna element is changed, a received signal (received power) variation pattern can be obtained depending on a phase difference between the phase of the phase shifter connected to the reference antenna element and the phase of the phase shifter connected to the target antenna element.

Therefore, a phase calibration, in which a phase of the target antenna element is aligned with a phase of the reference antenna element, can be performed by extracting a phase at which the received power becomes a local minimal value from the received power variation pattern, and by adding the phase extracted to 180° to set the resultant value as a phase value of the phase shifter connected to the target antenna element.

Additionally, when the above calibration is performed for all of the other antenna elements with respect to the target antenna element, a phase of all of the other antenna elements is aligned and then, a phase calibration of a whole of the phased array antenna can be performed.

In the related art, when only a phase of an arbitrary one antenna element is changed under on the condition that the plurality of antenna elements radiates radio waves with a predetermined power, a change in a received power of the radio waves received at the receiver is measured. In this case, since the change in the received power is small, a phase of the arbitrary one antenna element cannot be precisely obtained.

In contrast, in the exemplary aspect, since two antenna elements, i.e., the reference antenna element and the target antenna element radiate radio waves, a received power pattern of the radio waves received at the receiver becomes a difference between outputs of two antenna elements based on a change in a phase difference between two antenna elements, and then, a prominent local minimal value of a received power can be obtained.

That is, compared to the related art, a phase calibration can be accurately performed by extracting a phase of the target antenna element at which a local minimal value of a received power prominently occurs in a received power variation pattern and by adding the phase extracted to 180° to use the resultant value as a calibration value of the target antenna element.

The control processor may repeat the calibration process while changing the reference antenna element and the target antenna element until the calibration values for all of the plurality of antenna elements are obtained.

The reference antenna element may be one antenna element that is selected from the plurality of antenna elements and is repeatedly changed to another antenna element that was used as the target antenna element and its calibration value was obtained until the calibration values for all of the plurality of antenna elements are obtained, and the target antenna element may be one antenna element that is selected from the plurality of antenna elements adjacent to the reference antenna element and is repeatedly changed until the calibration values for all of the plurality of antenna elements are obtained.

According to the above phased array antenna, the phase calibration can be performed with a simpler process. The reason is described as follows.

Here, it is generally known that, if an object such as a metal object exists between two antenna elements, compared to the case where such an object does not exist, a received power variation pattern formed by the two antenna elements changes depending on the size and position of the metal object.

Particularly, a phased array antenna, which controls directivity while changing a phase of radio waves radiated by each antenna element, is required to obtain and correct a change in power of each phase.

However, in the exemplary aspect, since the phased array antenna can obtain a difference between outputs of two constantly adjacent antenna elements, because the two antenna elements are adjacent to each other, an object which can affect directivity formed by the two antenna elements cannot exist between them. Accordingly, the phased array antenna is not required to correct a received power every phase change, and then, can be calibrated with a simpler process.

According to an second exemplary aspect of the present invention, there is provided a phase calibration method for a phased array antenna that comprises an oscillator that generates radio waves, a plurality of antenna elements that radiates radio waves, a phase shifter that is connected to each of the plurality of antenna elements and changes a phase of radio waves radiated by the plurality of antenna elements, a distributor that distributes radio waves generated by the oscillator to the plurality of antenna elements via the phase shifter, a receiver that receives radio waves radiated by the plurality of antenna elements, and a control processor that performs a calibration process for the phased array antenna, the phase calibration method comprising: at the control processor, selecting, from the plurality of antenna elements, a reference antenna element to be a reference of a phase calibration for the phased array antenna and a target antenna element to be a target of the phase calibration with respect to the reference antenna element to allow the radio waves generated by the oscillator to be provided for the reference antenna element and the target antenna element via the distributer; obtaining a pattern of a change in a received power of radio waves received at the receiver, when a phase of the phase shifter connected to the reference antenna element is fixed and a phase of the phase shifter connected to the target antenna element is changed; extracting, from the pattern obtained, the phase of the phase shifter connected to the target antenna element at which the received power becomes local minimal value; and adding the phase extracted to 180° to set its resultant value to a calibration value for the phase of the phase shifter connected to the target antenna element.

The phase calibration method may further comprise repeating, at the control processor, the calibration process while changing the target antenna element until the calibration values for all of the plurality of antenna elements are obtained.

The reference antenna element may be one antenna element that is arbitrarily selected from the plurality of antenna elements and is kept selected until the calibration values for all of the plurality of antenna elements are obtained, and the target antenna element may be one antenna element that is selected from the plurality of antenna elements except for the reference antenna element and is repeatedly changed to another antenna element until the calibration values for all of the plurality of antenna elements are obtained.

According to the above phase calibration method, a phase of antenna elements of the phased array antenna can be easily and accurately calibrated.

The phase calibration method may further comprise repeating, at the control processor, the calibration process while changing the reference antenna element and the target antenna element until the calibration values for all of the plurality of antenna elements are obtained.

The reference antenna element may be one antenna element that is selected from the plurality of antenna elements and is repeatedly changed to another antenna element that was used as the target antenna element and its calibration value was obtained until the calibration values for all of the plurality of antenna elements are obtained, and the target antenna element may be one antenna element that is selected from the plurality of antenna elements adjacent to the reference antenna element and is repeatedly changed until the calibration values for all of the plurality of antenna elements are obtained.

According to the above phase calibration method, the phase of antenna elements of the phased array antenna can be easily and accurately calibrated.

DETAILED DESCRIPTION OF THE PREFERRED EMBODIMENTS

With reference to the accompanying drawings, hereinafter is described a phased array antenna and its calibration method according to an exemplary embodiment of the present invention.

First Embodiment

Figure 1:
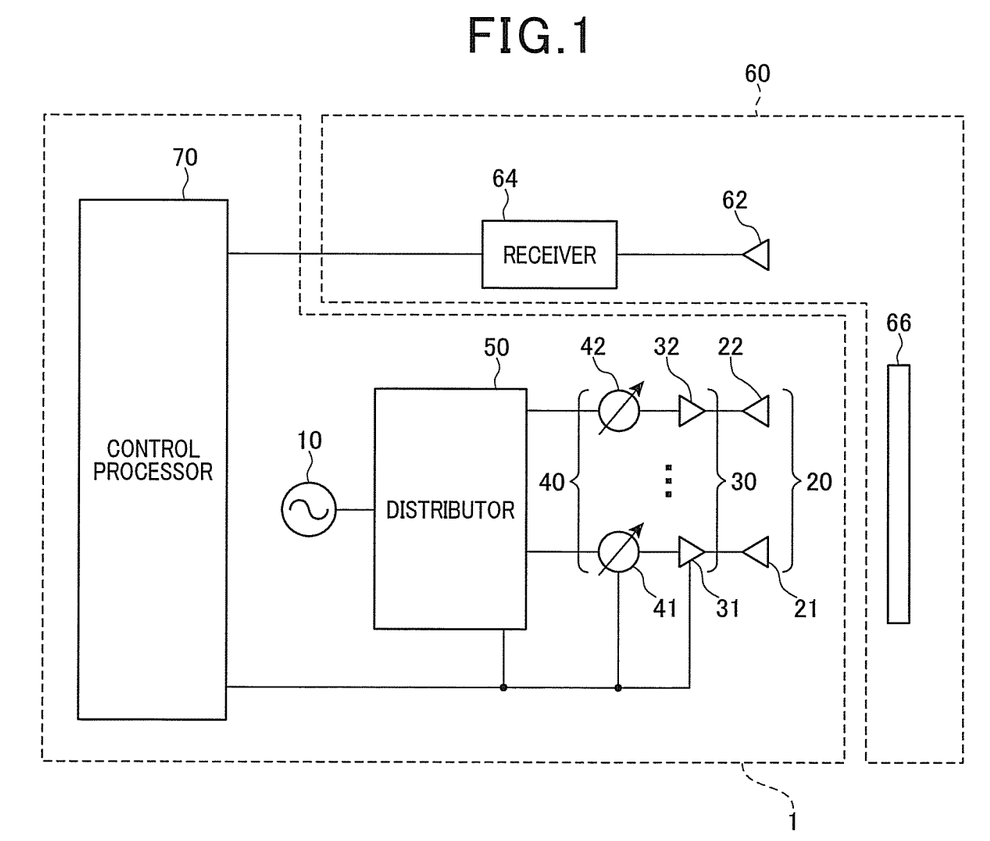
FIG. 1 is a schematic block diagram illustrating a configuration of a phased array antenna according to a first exemplary embodiment of the present invention.

FIG. 1 is a schematic block diagram illustrating a configuration of a phased array antenna 1 according to a first exemplary embodiment. The phased array antenna 1 can be applied to a radar apparatus such as an on-board radar mounted on a vehicle. A shown in FIG. 1, the phased array antenna includes an oscillator 10, a plurality of transmitting antenna elements 20 (hereinafter referred to as "antenna elements"), an amplifier 30, a phase shifter 40, a distributor 50, and a control processor 70.

Additionally, a received power detector 60 (corresponding to a "receiving unit" according to the exemplary embodiment of the present invention) is arranged to detect a radiated power of radio waves outputted by the phased array antenna 1.

The oscillator 10 is a device that generates radio waves, and outputs a high-frequency (radio-frequency) signal oscillated by e.g., a Klystron, a travelling-wave tube, a magnetron, a Gunn diode as radio wave with stable frequency of several gigahertz (GHz) suitable for radar using an automatic frequency control circuit.

The plurality of antenna elements 20 is an aperture antenna such as a horn antenna, or a planer antenna such as a patch antenna, and, in the present embodiment, is arranged on a straight line at equally spaced intervals.

The amplifier 30 is a device that is connected to each antenna element 20, and amplifies power of radio waves outputted by the plurality of antenna elements.

The phase shifter 40 is a device that is connected to each antenna element 20, and changes a phase of radio waves outputted by the plurality of the antenna elements 20 to form and steer beams of radio waves in the desired direction.

As the phase shifter 40, a switched-line type phase shifter using a PIN (p-intrinsic-n diode) diode, or a reflection-type phase shifter with a GaAs FET (gallium arsenide field-effect transistor), etc. is used.

The distributor 50 is a device that distributes radio waves generated by the oscillator 10 to the plurality of antenna elements 20 via the phase shifter 40. In the embodiment, the distributor 50 is a selection switch that receives instruction signals from the control processor 70 and selects one or more of the plurality of antenna elements 20 for emitting radio waves based on the instruction signal.

The received power detector 60 is a device that detects a power of radio waves radiated by the plurality of antenna elements 20 and outputs a detected received power to the control processor 70, and includes a receiving antenna 62, a receiver 64, and reflector 66.

The receiving antenna 62 is a device that receives radio waves reflected by the reflector 66 among radio waves outputted by the plurality of antenna elements 20.

The reflector 66 is a reflecting plate such as a corner reflector or a metallic plate that reflects radio waves outputted by the plurality of antenna elements 20, is located at 0° direction with respect to a direction perpendicular to a radio wave radiation plane of the plurality of antenna elements 20.

The receiver 64 is a device that receives radio waves reflected by the reflector 66, detects the radio waves, and outputs them to the control processor 70.

The control processor 70 is a device that controls the phase shifter 40 and the distributor 50 and records power detected by the receiver 64 to indentify positions of reflecting objects in a radar detection area that can be detected by the radar, and includes a CPU (central processing unit), ROM (read only memory), RAM (random access memory), and I/O (input/output) (not shown). The control processor 70 reads a program stored in the ROM and then executes the following calibration process.

Figure 2:
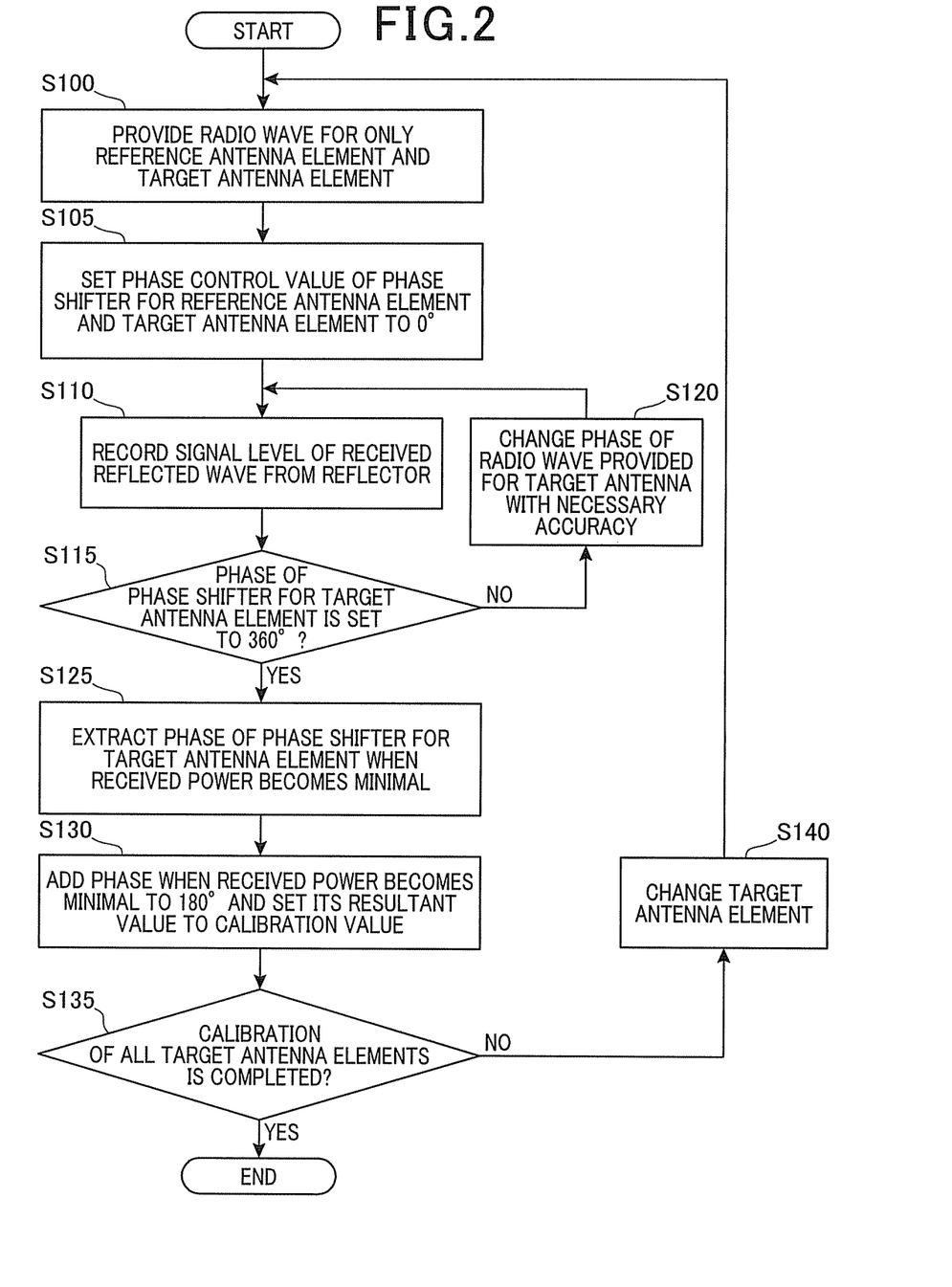
FIG. 2 is a flowchart illustrating a flow of a calibration process according to the first exemplary embodiment.

Next, referring to FIG. 2, a calibration process executed by the CPU of the control processor 70 is described. FIG. 2 is a flowchart showing a flow of the calibration process.

In the calibration process, first, at step S100, the CPU performs a process to provide radio waves having the same power for only a reference antenna element 21 to be a reference of a phase calibration of all of the antenna elements 20 and a target antenna element 22 except for the reference antenna element 21 of all of the antenna elements 20. The target antenna element 22 is a target of the phase calibration with respect to the reference antenna element 21.

Specifically, the CPU performs a process to set the distributor 50, the phase shifter 50 and the amplifier 30 in such a manner that radio waves oscillated by oscillator 10 is provided for only the reference antenna element 21 and the target antenna element 22 with the same power and is not provided for the other antenna elements.

Here, the reference antenna element 21 is an antenna element 20 that is arbitrarily selected from all of the antenna elements 20 so as to determine a phase to be the reference for a phase calibration of the antenna elements 20. In the phase calibration, all phases of the other antenna elements 20 are aligned with a phase of the reference antenna element 21.

Subsequently, at step S105, the CPU performs a process to set a phase (phase control value) of a phase shifter 41 connected to the reference antenna element 21 and a phase shifter 42 connected to the target antenna element 22 to 0 degree (°).

After that, at steps S110 to S120, the CPU performs a process to record a change in a received power due to a phase change of the target antenna element 22.

Specifically, the CPU performs processes to obtain a received power of radio waves received at the receiver 64 via the receiving antenna 62 (a received signal level of reflection waves reflected at the reflector 66), while a phase of the phase shifter 42 connected to the target antenna element 22 is changed within the range 0° to 360° by a predetermined phase amount of a necessary accuracy, e.g., 1° in the present embodiment under the condition that a phase of the phase shifter 41 connected to the reference antenna element 21 is fixed.

Figure 3:
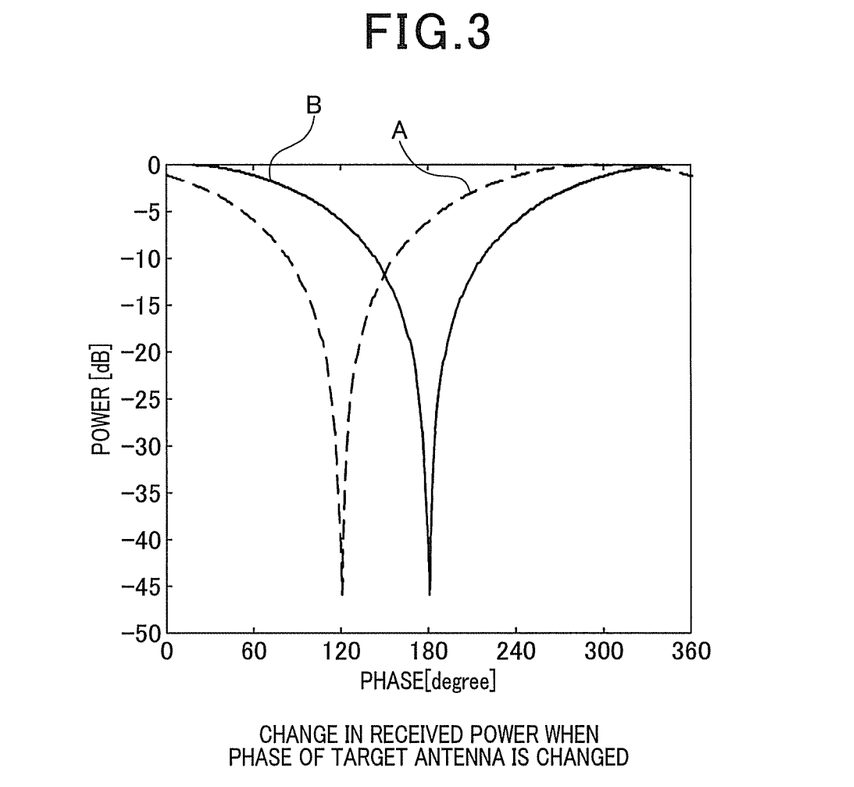
FIG. 3 is a graph illustrating an example of a received power variation pattern when a phase of a target antenna to be calibrated is changed, according to the first exemplary embodiment.

The received power obtained is stored in the RAM of the control processor 70 as a received power variation pattern graphically represented in such a manner that a phase and a received power are given on horizontal and vertical axes, respectively. FIG. 3 shows the received power variation pattern graphically represented.

In FIG. 3, the vertical axis shows a received power, and the horizontal axis shows a phase setting value of the phase shifter 42 connected to the target antenna element 22.

In FIG. 3, a graph denoted by "A" represents a received power variation pattern where a phase difference between the reference antenna element 21 and the target antenna element 22 is −60°, and a graph denoted by "B" represents a received power variation pattern where a phase difference between the reference antenna element 21 and the target antenna element 22 is 0°, i.e., a waveform in a calibrated condition.

Subsequently, at step S125, the CPU performs a process to extract a phase of the phase shifter 42 when the received power becomes a local minimal value shown in FIG. 3 from the graph of the received power variation pattern obtained at steps S110 to S120. In the present embodiment, the phase extracted is 120°.

At step S130, the CPU performs a process to set the phase of the phase shifter 42 in such a manner that it becomes a value obtained by adding the phase when the received power becomes a local minimum, extracted at step S125, to 180°. Alternatively, the value to be set at this step may be a value obtained by subtracting 180° from the phased extracted at step S125.

At step S135, the CPU performs a process to judge whether or not a calibration of all of the target antenna elements 22 is completed. As a result, if the CPU judges that the calibration of all of the target antenna elements 22 is completed (Yes in step S135), the calibration process is ended. Also, if the CPU judges that the calibration of all of the target antenna elements 22 is completed, the CPU proceeds to step S140.

At step S140, the CPU performs a process to change the target antenna element 22. In the process, the CPU changes the target antenna element 22 whose phase calibration is completed at steps S100-S130 into the other antenna element 20 to be new target antenna element 22, and subsequently returns to the process of step S100 to repeat the processes of steps S100-S140 for both of the new target antenna element 22 and the reference antenna element 21.

In the present embodiment, the phased array antenna 1 obtains a received power variation pattern by receiving, at the received power detector 60, a power of radio waves outputted by the reference antenna element 21 and the target antenna element, while a phase of the phase shifter 42 connected to the target antenna element 22 is changed under the condition that a phase of the phase shifter 41 connected to the reference antenna element 21 is fixed.

In this case, since a local minimal value occurs in the received power variation pattern, a value obtained by adding 180° to a phase of the phase shifter 42 connected to the target antenna element 22 at which the local minimal value occurs is set as a calibration value of a phase of the phase shifter 42 connected to the target antenna element 22.

This makes it possible to perform a phase calibration to align the phase of the target antenna element 22 with that of the reference antenna element 21.

In the processes of the above steps, the phase calibration for all of the antenna elements 20 are performed and then phases of all of the antenna elements 20 are aligned with each other. Therefore, the phase calibration for the whole of the phased array antenna 1 can be performed.

In addition, regarding powers of radio waves outputted by the reference antenna element 21 and the target antenna element 22, in the case when amplitudes of radio waves outputted by both antenna elements 21 and 22 are equal to each other, if both radio waves become reverse in phase to each other (i.e. offset by 180°), a prominent local minimal value is obtained, and then, the relative phase difference can be accurately grasped.

According to the present embodiment, a phase is extracted from a local minimal value that prominently appears in the received power variation pattern, and the extracted phase is added to 180° to use a resultant value as a calibration value. Therefore, the phase calibration can be precisely performed, compared to the related art in which a change in a received power is monitored while a phase of only arbitrary one antenna element is changed under the condition that a plurality of antenna elements radiates radio waves with a predetermined power.

Second Embodiment

Next, the phased array antenna 1 according to a second exemplary embodiment that is different from the above first embodiment in a selection of the reference antenna element 21 and the target antenna element 22 is described.

In the phased array antenna 1 according to the present embodiment, the components identical with or similar to those in the phased array antenna 1 according to the first embodiment are given the same reference numerals for the sake of omitting unnecessary explanation.

In the control processor 70 of the phased array antenna 1, the CPU reads a program stored in the ROM and then executes the following calibration process.

Figure 4:
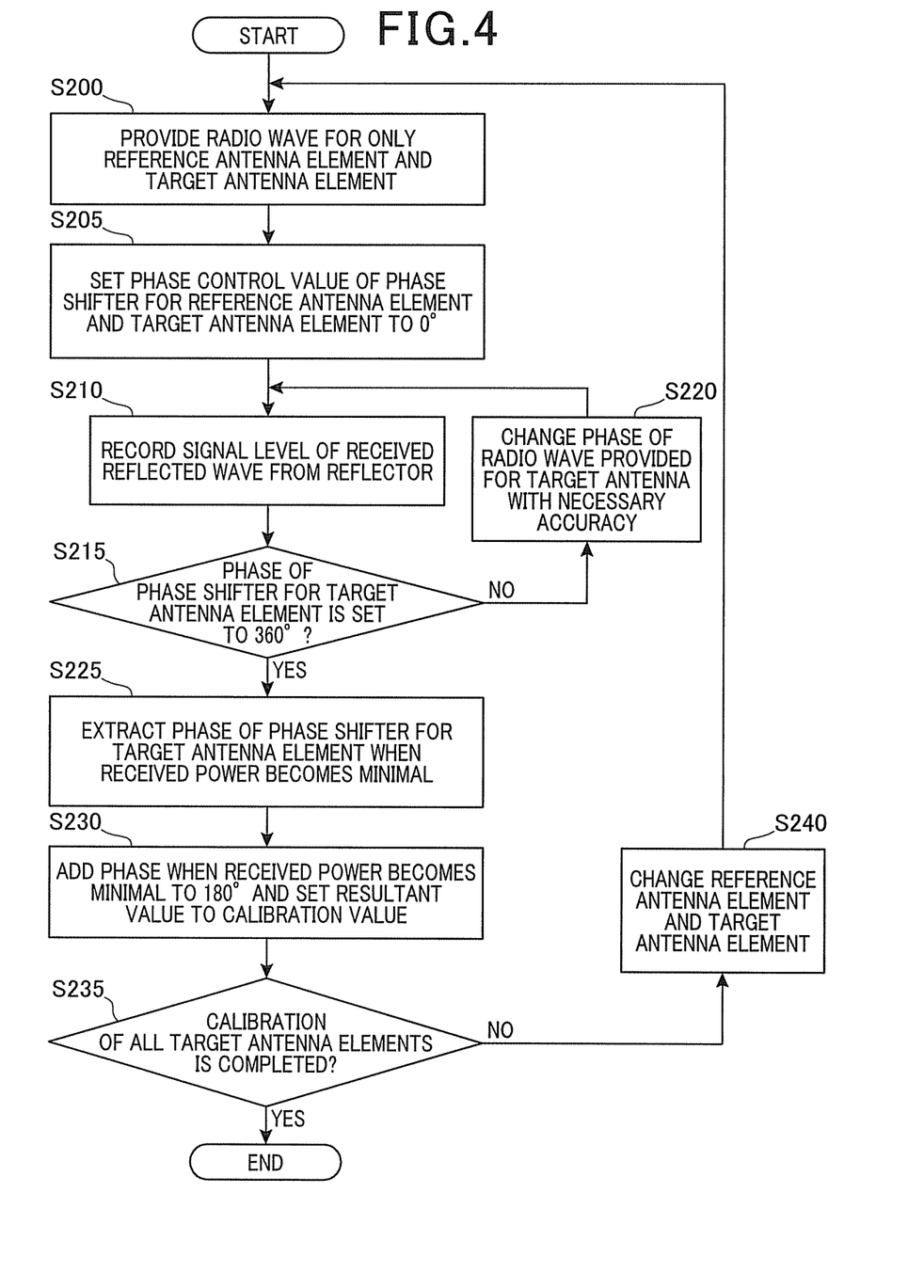
FIG. 4 is a flowchart illustrating a flow of a calibration process according to a second exemplary embodiment of the present invention.

FIG. 4 shows a flow of a calibration process performed by the CPU of the control processor 70 according to the present embodiment.

In the calibration process, first, at step S100, the CPU performs a process to provide only a reference antenna element 21 to be reference of a phase calibration of all of the antenna elements 20 and a target antenna element 22 adjacent to the reference antenna element 21 of all of the antenna elements 20 with same power.

Specifically, the CPU performs a process to set the distributor 50 in such a manner that radio waves oscillated by oscillator 10 is provided for only the reference antenna element 21 and the target antenna element 22 adjacent to the reference antenna element 21 with the same power and is not provided for the other antenna elements.

Here, the reference antenna element 21 is an antenna element 20 that is arbitrarily selected from all of the antenna elements 20 so as to determine a phase to be a reference for a phase calibration of the antenna elements 20.

In the phase calibration, a phase of the target antenna element 22 adjacent to the reference antenna element 21 is calibrated with reference to a phase of the reference antenna element 21. Subsequently, the target antenna element 22 in which a calibration is completed is used as a new reference antenna element 21, a phase of a new target antenna element 22 adjacent to the new reference antenna element 21 is calibrated with reference to a phase of the new reference antenna element 21. The same calibration is sequentially performed so that all phases of the antenna elements 20 are aligned with each other.

Subsequently, at step S205, the CPU performs a process to set phases of the phase shifter 41 and 42 connected to the reference antenna element 21 and the target antenna element 22 to 0°.

After that, at steps S210 to S220, the CPU performs a process to record a change in a received power due to a phase change of the target antenna element 22.

Specifically, the CPU performs processes to obtain a received power of radio waves received at the receiver 64, while a phase of the phase shifter 42 connected to the target antenna element 22 is changed within the range 0° to 360° by a predetermined phase amount of a necessary accuracy, e.g., 1° in the present embodiment under the condition that a phase of the phase shifter 41 connected to the reference antenna element 21 is fixed.

The received power obtained is stored in the RAM as a received power variation pattern graphically represented in such a manner that a phase and a received power are given on horizontal and vertical axes, respectively. As shown in FIG. 3, the received power variation pattern is a graph having a local minimal value.

Subsequently, at step S225, the CPU performs a process to extract a phase of the phase shifter 42 when the received power becomes a local minimal value shown in FIG. 3 from the graph of the received power variation pattern obtained at steps S210 to S220.

At step S230, the CPU performs a process to set the phase of the phase shifter 42 in such a manner that it becomes a value obtained by adding the phase at which the received power becomes a local minimum, extracted at step S210, to 180°.

At step S235, the CPU performs a process to judge whether or not a calibration to all of the target antenna elements 22 is completed. If the CPU judges that the calibration to all of the target antenna elements 22 is completed (Yes in step S235), the calibration process is ended. If the CPU judges that the calibration to all of the target antenna elements 22 is completed, the CPU proceeds to step S240.

At step S240, the CPU performs a process to change the reference antenna element 21 and the target antenna element 22. In the process, the CPU performs to set the target antenna element 22, whose phase calibration is completed, to a new reference antenna element 21, and to set an antenna element 20 adjacent to the new reference antenna element 21 to a new target antenna element 22.

After that, the CPU returns to the process step S200 to repeat the processes of steps S200-S240 for both of the new reference antenna element 21 and the new target antenna element 22 adjacent to it.

Here, it is generally known that, if an object such as a metal object exists around the antenna element, its received power variation pattern changes, compared to the case where such an object does not exist.

Particularly, in the case of a phased array antenna including two antenna elements, if an object, which can interrupt propagation of radio waves, exists between the two antenna elements, a directivity formed by the phased array antenna changes due to the position and size of this object. In this case, a phased array antenna, which controls directivity while changing a phase of radio waves radiated by each antenna element, is required to analyze and correct a change in power of each phase.

However, since the phased array antenna 1 according to the present embodiment can obtain a difference between outputs of two constantly adjacent antenna elements 20, because the two antenna elements 20 are adjacent to each other, no object which can affect a directivity formed by the two antenna elements 20 can exist between them.

Accordingly, the phased array antenna 1 is not required to correct a received power every phase change, and then, can be calibrated with more simple process.

Other Embodiments

The present invention is described with reference to the above exemplary embodiments thereof, but the present invention is not limited to these embodiments. Various changes in form and details may be made, for example, as below.

Figure 5:
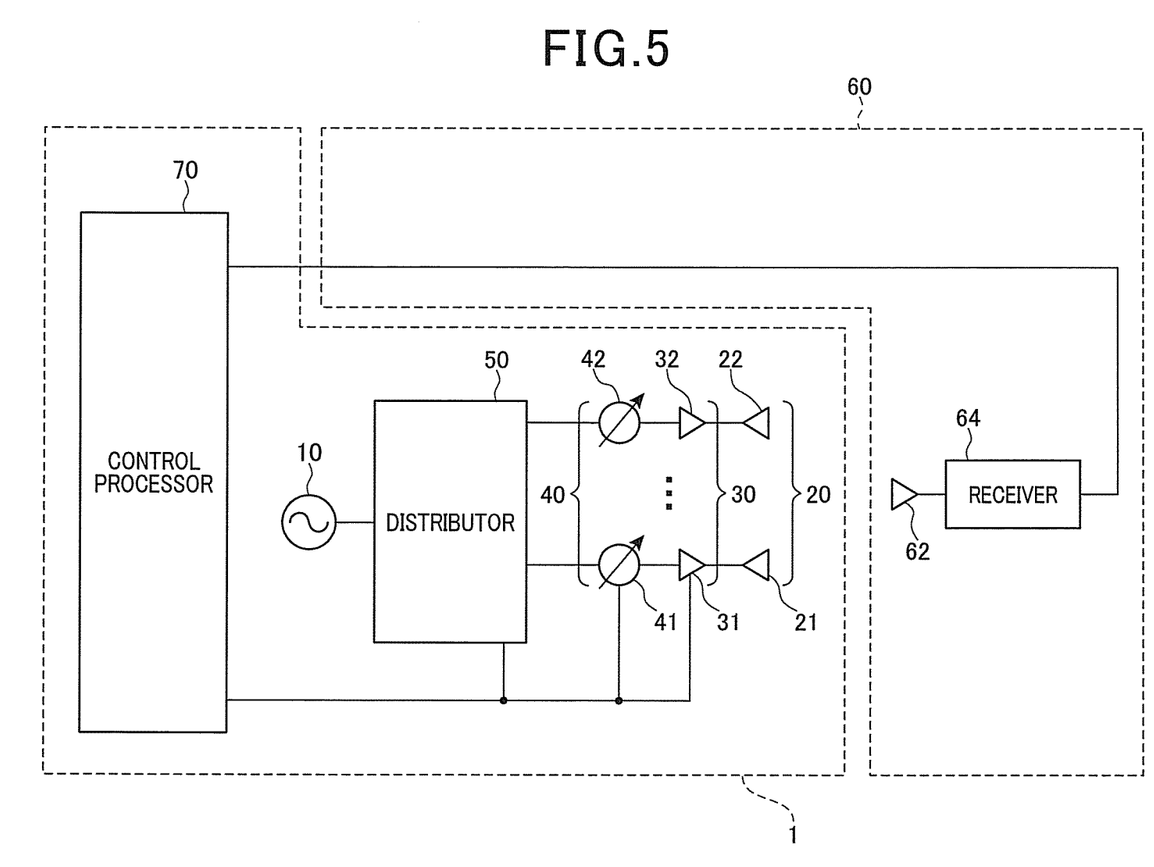
FIG. 5 is a schematic block diagram illustrating a configuration of a phased array antenna that obtains a received power variation pattern at a receiver located at the 0° direction with respect to a direction perpendicular to the radio wave radiation plane.

(1) In the above embodiments, when a received power variation pattern is obtained, the receiver 64 may receive radio waves reflected by the reflector 66 via the receiving antenna 62. Alternatively, as shown in FIG. 5, without the reflector 66, the receiver 64 may be located at the 0° direction with respect to a direction perpendicular to a radio wave radiation plane so as to obtain the receive power variation pattern at the receiver 64.

(2) In the above embodiments, the plurality of antenna elements 20 forming the phased array antenna 1 is arranged on an approximately straight line. Alternatively, the plurality of antenna elements 20 may be arranged on a two-dimensional plane in a matrix pattern.

In this case, among the plurality of antenna elements 20, one may be set to the reference antenna element 21, a calibration may be performed every row and column with reference to a phase of the reference antenna element 21.

(3) In the above embodiments, the distributor 50 receives instruction signal from the control processor 70 and selects one or more of the plurality of antenna elements 20 for providing radio waves based on the instruction signal. Alternatively, the amplifier 30 may be used.

That is, the distributor 50 may include a distribution unit that has a function to only distribute radio waves generated by the oscillator 10 to all of the plurality of antenna elements 20, and a amplifier 30 connected to each antenna element 20. In this case, the distribution unit distributes the radio waves to all of the plurality of antenna elements 20. Here, if the gain of the amplifier 30, which is connected to the antenna elements except for the antenna elements 21, 22, and 23, is set to zero, the radio waves can be provided for only the antenna elements 21, 22, and 23 via the amplifier 30.

In this case, alternatively, a high-frequency switch may be used instead of the amplifier 30. Even in this configuration, the same effect can be obtained.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A phased array antenna, comprising:
an oscillator that generates radio waves;
a plurality of antenna elements that radiates radio waves:
a phase shifter that is connected to each of the plurality of antenna elements and changes a phase of radio waves radiated by the plurality of antenna elements;
a distributor that distributes radio waves generated by the oscillator to the plurality of antenna elements via the phase shifter;
a receiving unit that receives radio waves radiated by the plurality of antenna elements; and
a control processor that performs a calibration process to
select, from the plurality of antenna elements, a reference antenna element to be a reference of a phase calibration for the phased array antenna and a target antenna element to be a target of the phase calibration with respect to the reference antenna element to allow the radio waves generated by the oscillator to be provided for the reference antenna element and the target antenna element via the distributor,
obtain, as a received power variation pattern, a received power of radio waves received at the receiving unit, while a phase of the phase shifter connected to the reference antenna element is fixed and a phase of the phase shifter connected to the target antenna element is changed within a range of 0° to 360° by a predetermined phase amount of a necessary accuracy, the received power variation pattern being graphically represented by the received power and the phase of the phase shifter connected to the target antenna element,
extract, from the obtained received power variation pattern, the phase of the phase shifter connected to the target antenna element at which the received power becomes a local minimal value, and
add the extracted phase to 180° to set its resultant value to a calibration value for the phase of the phase shifter connected to the target antenna element.

2. The phased array antenna according to claim 1, wherein the control processor repeats the calibration process while changing the target antenna element until the calibration values for all of the plurality of antenna elements are obtained.

3. The phased array antenna according to claim 2, wherein the reference antenna element is one antenna element that is arbitrarily selected from the plurality of antenna elements and is kept selected until the calibration values for all of the plurality of antenna elements are obtained, and the target antenna element is one antenna element that is selected from the plurality of antenna elements except for the reference antenna element and is repeatedly changed to another antenna element until the calibration values for all of the plurality of antenna elements are obtained.

4. The phased array antenna according to claim 1, wherein the control processor repeats the calibration process while changing the reference antenna element and the target antenna element until the calibration values for all of the plurality of antenna elements are obtained.

5. The phased array antenna according to claim 4, wherein the reference antenna element is one antenna element that is selected from the plurality of antenna elements and is repeatedly changed to another antenna element that was used as the target antenna element and its calibration value was obtained until the calibration values for all of the plurality of antenna elements are obtained, and the target antenna element is one antenna element that is selected from the plurality of antenna elements adjacent to the reference antenna element and is repeatedly changed until the calibration values for all of the plurality of antenna elements are obtained.

6. A phase calibration method for a phased array antenna that comprises an oscillator that generates radio waves, a plurality of antenna elements that radiates radio waves, phase shifter that is connected to each of the plurality of antenna elements and changes a phase of radio waves radiated by the plurality of antenna elements, distributor that distributes radio waves generated by the oscillator to the plurality of antenna elements via the phase shifter, receiving unit that receives radio waves radiated by the plurality of antenna elements, and a control processor that performs a calibration process for the phased array antenna, the phase calibration method comprising:
at the control processor,
selecting, from the plurality of antenna elements, a reference antenna element to be a reference of a phase calibration for the phased array antenna and a target antenna element to be a target of the phase calibration with respect to the reference antenna element to allow the radio waves generated by the oscillator to be provided for the reference antenna element and the target antenna element via the distributor;
obtaining, as a received power variation pattern, a received power of the radio waves received at the receiving unit, while a phase of the phase shifter connected to the reference antenna element is fixed and a phase of the phase shifter connected to the target antenna element is changed within a range of 0° to 360° by a predetermined phase amount of a necessary accuracy, the received power variation pattern being graphically represented by the received power and the phase of the phase shifter connected to the target antenna element;
extracting, from the obtained received power variation pattern, the phase of the phase shifter connected to the target antenna element at which the received power becomes a local minimal value; and
adding the extracted phase to 180° to set its resultant value to a calibration value for the phase of the phase shifter connected to the target antenna element.

7. The phase calibration method according to claim 6, further comprising:
repeating, at the control processor, the calibration process while changing the target antenna element until the calibration values for all of the plurality of antenna elements are obtained.

8. The phase calibration method according to claim 7, wherein
the reference antenna element is one antenna element that is arbitrarily selected from the plurality of antenna elements and is kept selected until the calibration values for all of the plurality of antenna elements are obtained, and
the target antenna element is one antenna element that is selected from the plurality of antenna elements except for the reference antenna element and is repeatedly changed to another antenna element until the calibration values for all of the plurality of antenna elements are obtained.

9. The phase calibration method according to claim 6, further comprising:
repeating, at the control processor, the calibration process while changing the reference antenna element and the target antenna element until the calibration values for all of the plurality of antenna elements are obtained.

10. The phase calibration method according to claim 9, wherein
the reference antenna element is one antenna element that is selected from the plurality of antenna elements and is repeatedly changed to another antenna element that was used as the target antenna element and its calibration value was obtained until the calibration values for all of the plurality of antenna elements are obtained, and
the target antenna element is one antenna element that is selected from the plurality of antenna elements adjacent to the reference antenna element and is repeatedly changed until the calibration values for all of the plurality of antenna elements are obtained.

* * * * *